United States Patent
Tsutsui et al.

(10) Patent No.: US 6,882,521 B2
(45) Date of Patent: Apr. 19, 2005

(54) CHIP-TYPE CAPACITOR, METHOD OF MANUFACTURING THE SAME AND MOLDING DIE

(75) Inventors: Makoto Tsutsui, Uozu (JP); Toshihisa Nagasawa, Kurobe (JP)

(73) Assignees: NEC Tokin Corporation, Sendai (JP); NEC Tokin Toyama, Ltd., Toyama (JP)

(*) Notice: Subject to any disclaimer, the term of this patent is extended or adjusted under 35 U.S.C. 154(b) by 0 days.

(21) Appl. No.: 10/738,863

(22) Filed: Dec. 16, 2003

(65) Prior Publication Data

US 2004/0160730 A1 Aug. 19, 2004

(30) Foreign Application Priority Data

Feb. 14, 2003 (JP) ........................................ 2003-037045

(51) Int. Cl.[7] ................................................. H01G 9/00
(52) U.S. Cl. ........................ 361/523; 361/535; 361/517; 29/25.03
(58) Field of Search ........................ 361/523, 535–538, 361/517, 518, 301.3; 29/25.03

(56) References Cited

U.S. PATENT DOCUMENTS 5,638,253 A * 6/1997 Hasegawa .................... 361/535
6,356,431 B1 * 3/2002 Lin et al. ..................... 361/307

FOREIGN PATENT DOCUMENTS

| JP | 2001-291641 A | 10/2001 |
| JP | 2002-43175 A | 2/2002 |

* cited by examiner

*Primary Examiner*—Anthony Dinkins
(74) *Attorney, Agent, or Firm*—Frishauf, Holtz, Goodman & Chick, P.C.

(57) ABSTRACT

A chip-type capacitor includes a capacitor element, an encapsulation resin covering an entirety of the capacitor element, an anode terminal having a base portion whose bottom surface is exposed on a mounting surface of the encapsulation resin and a standing-up portion perpendicular to the base portion and having one end connected to the base portion and the other end welded to an anode lead wire led out from the capacitor element, and a cathode terminal fixed through a conductive adhesive to the capacitor element so as to expose a bottom surface on the mounting surface of the encapsulation resin. A depressed portion is formed on each of opposite side surfaces of the encapsulation resin, thereby partially exposing a top surface of each of the anode and the cathode terminals opposite to the bottom surface to form a terminal exposed portion exposed out of the encapsulation resin.

13 Claims, 5 Drawing Sheets

CHIP-TYPE CAPACITOR, METHOD OF MANUFACTURING THE SAME AND MOLDING DIE

The present application claims priority to prior Japanese application JP 2003-37045, the disclosure of which is incorporated herein by reference.

BACKGROUND OF THE INVENTION

The present invention relates to a chip-type capacitor having a resin-encapsulated structure, a method of manufacturing the same and a molding die.

An existing chip-type capacitor of the type includes a capacitor element, an anode terminal, a cathode terminal, and an encapsulation resin covering these components.

A capacitor element is produced by preparing powder of a valve action metal, burying an anode lead wire in the powder with its one end led out from the powder, molding and sintering the powder to form a porous anode body, forming a dielectric oxide film on the anode body by a known technique, and successively forming, on a surface of the dielectric oxide film, an electrolyte layer and a cathode layer. Furthermore, the anode terminal has a base portion having a bottom surface exposed on a mounting surface of the encapsulation resin and a standing-up portion perpendicular to the base portion. The anode lead wire led out from the capacitor element is connected to the standing-up portion of the anode terminal by a known technique such as laser welding. On the other hand, the cathode terminal is connected and fixed through a conductive adhesive to the cathode layer of the capacitor element so that a bottom surface of the cathode terminal is exposed on the mounting surface of the encapsulation resin. The encapsulation resin is formed by transfer molding so as to cover an entirety of the capacitor element and a connecting portion between the capacitor element and each of the anode and the cathode terminals. The encapsulation resin, together with the anode and the cathode terminals, is cut into a desired outer dimension by, for instance, dicing. Thus, the chip-type capacitor is formed.

The existing chip-type capacitor is simple in connecting structure between the capacitor element and each of the anode and the cathode terminals. It is therefore possible to improve an accommodation volume efficiency of the capacitor element with respect to the encapsulation resin. Accordingly, the chip-type capacitor can be reduced in size and thickness and yet large in capacity so as to meet the recent demand for a small-sized, thin-profile, and light-weight portable equipment, such as a mobile telephone.

In the above-mentioned existing chip-type capacitor, sections of the anode and the cathode terminals are exposed on the side surfaces of the capacitor. When the capacitor is mounted on a substrate, a plating process for plating the sections of the anode and the cathode terminals must be carried out in order to assure wetting-up (hereinafter referred to as a "fillet") of a solder over the sections of the anode and the cathode terminals. The application of the plating process results in an increase in production cost and production time (lead-time). Furthermore, there arises a problem that, if a liquid leaks into the inside of the encapsulation resin during a series of plating processes such as degreasing, plating, cleaning and rust-proofing, the electric characteristics and the reliability of the capacitor will be deteriorated.

In mounting of the chip-type capacitor, it is general that the capacitor is mounted on a land formed on the substrate and thereafter soldered by reflow soldering. At that time, due to the surface tension of the solder, a so-called Manhattan phenomenon or Tombstone phenomenon is often caused to occur in which one of the terminals stands up from the substrate to be perpendicular thereto. In particular, such phenomenon is more likely to occur in a smaller-size and lighter-weight tiny chip. It is therefore essential and indispensable to form a fillet which serves to improve the stability of a mounting posture.

In order to solve the above-mentioned problems, JP-A Nos. 2001-291641 and 2002-43175 (hereinafter will be called as References 1 and 2, respectively) propose methods of forming a fillet without performing the plating process after the terminals are cut.

In the method disclosed in Reference 1, each of an anode terminal and a cathode terminal is provided with a terminal bending portion so as to allow a solder to enter into a space under the bending portion, thereby forming a fillet.

In the method disclosed in Reference 2, a part of the anode and the cathode terminal is raised to form a terminal standing-up portion, which is exposed on an outer surface of the encapsulation resin, and the fillet is formed at the standing-up portion.

However, in the chip-type capacitors described in References 1 and 2, a lead frame (strip-like metal plate) must be preliminarily subjected to complicated processing in order to execute micro-bending of a part of each terminal. This results in an increase in production cost. Since the surface of each of the terminal bending portion and the terminal standing-up portion is not clamped by an upper die and a lower die of a molding die and is not pressed, the resin is likely to intrude and adhere to the surface of the terminal. Such intrusion and adhesion of the resin is one of factors preventing the formation of the fillet when the capacitor is mounted on the substrate.

Furthermore, in order to prevent the adhesion of the resin, it is necessary to introduce an additional production step, such as a step of sticking a masking tape to the terminal, a horning step after the molding. This results in an increase in production cost. After the mounting, the fillet is formed inwardly from the outer contour of the capacitor so that the visibility from the above is poor. Particularly upon mounting with a high density, inspection is difficult after the capacitor is mounted on the substrate.

SUMMARY OF THE INVENTION

Accordingly, it is an object of the present invention to provide a chip-type capacitor which is capable of forming a fillet essential and indispensable for stabilization of a mounting posture without requiring an additional production step such as masking and horning.

It is another object of the present invention to provide a method of manufacturing the chip-type capacitor mentioned above.

It is still another object of the present invention to provide a molding die for performing the method.

In order to overcome the above-mentioned problems, production of a chip-type capacitor in this invention comprises the steps of forming a depressed portion on a side surface of the capacitor so that a terminal exposed portion exposed out of the encapsulation resin is formed on a top surface of a terminal that is opposite to a bottom surface exposed on a mounting surface of the encapsulation resin.

According to one aspect of the present invention, there is provided a chip-type capacitor including a capacitor element, an encapsulation resin covering an entirety of the capacitor element, an anode terminal having a base portion whose bottom surface is exposed on a mounting surface of the encapsulation resin and a standing-up portion perpendicular to the base portion and having one end connected to the base portion, and a cathode terminal having a bottom surface exposed on the mounting surface of the encapsulation resin. The capacitor element includes a porous anode body made of a valve action metal in which an anode lead wire is buried with its one end led out therefrom, a dielectric oxide film formed on the anode body, an electrolyte layer formed on the dielectric oxide film, and a cathode layer formed on the electrolyte layer. The standing-up portion of the anode terminal has the other end welded to the anode lead wire so as to intersect therewith. The cathode terminal is connected and fixed through a conductive adhesive to the cathode layer so as to expose a bottom surface on the mounting surface of the encapsulation resin. The chip-type capacitor is provided with a depressed portion formed on each of opposite side surfaces of the encapsulation resin and extending in a direction perpendicular to a longitudinal direction of the capacitor element, thereby partially exposing a top surface of each of the anode and the cathode terminals that is opposite to the bottom surface to form a terminal exposed portion exposed out of the encapsulation resin.

According to another aspect of the present invention, there is provided a method of producing a chip-type capacitor described above, the method comprising the steps of forming, by transfer molding, a cavity portion on each of the side surfaces of the encapsulation resin so that the cavity portion reaches the top surface of each of the anode and the cathode terminals that is opposite to the bottom surface exposed on the mounting surface of the encapsulation resin.

According to still another aspect of the present invention, there is provided a molding die which is for use in the above-mentioned method of producing a chip-type capacitor and which comprises an upper die having a flat surface adapted to be brought into tight contact with the base portion of the anode terminal and with the cathode terminal, and a lower die which is adapted to be brought into tight contact with the upper die and surrounding an entirety of the capacitor element, a connecting portion between the anode terminal and the anode lead wire, and a connecting portion between the cathode terminal and the capacitor element. The lower die includes a pair of plungers faced to the upper die and clamping a part of the base portion of the anode terminal and a part of the cathode terminal without leaving a gap, respectively. The plungers are adapted to form the cavity portions.

DESCRIPTION OF THE PREFERRED EMBODIMENTS

Prior to description of embodiments according to the present invention, several known chip-type capacitors will be described with reference to FIGS. 1 through 4.

Figure 1:
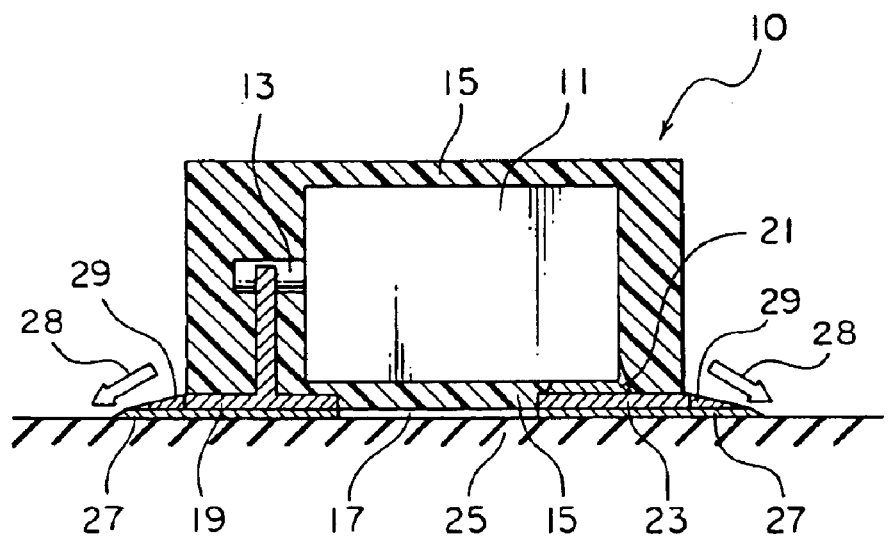
FIG. 1 is a sectional view of an existing chip-type capacitor in the state where it is mounted on a substrate.
Figure 2:
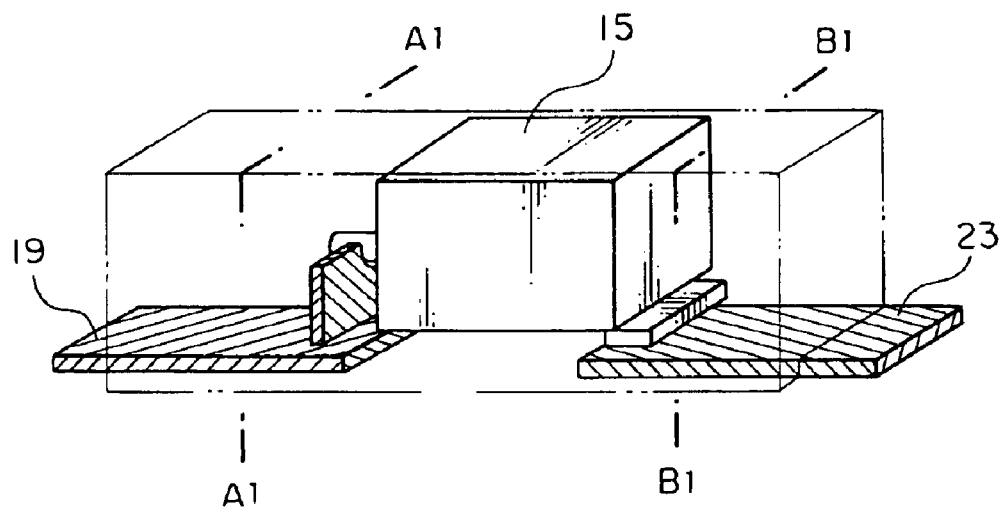
FIG. 2 is a perspective view for describing a production process of the existing chip-type capacitor illustrated in FIG. 1.

Referring to FIGS. 1 and 2, an existing chip-type capacitor 10 includes a capacitor element 11, an encapsulation resin 15, an anode terminal 19, and a cathode terminal 23. The capacitor element 11 is produced by preparing powder of a valve action metal, burying an anode lead wire 13 in the powder with its one end led out from the powder, molding and sintering the powder to form a porous anode body, forming a dielectric oxide film (not shown) on the anode body by a known technique, and successively forming, on a surface of the dielectric oxide film, an electrolyte layer (not shown) and a cathode layer (not shown).

The anode terminal 19 has a base portion whose bottom surface is exposed on a mounting surface 17 of the encapsulation resin 15 and a standing-up portion perpendicular to the base portion. The anode lead wire 13 led out from the capacitor element 11 is connected to the standing-up portion of the anode terminal 19 by a known technique such as laser welding.

The cathode terminal 23 is connected and fixed to the cathode layer of the capacitor element 11 through a conductive adhesive 21 so that a bottom surface of the cathode terminal 23 is exposed on the mounting surface 17. The encapsulation resin 15 is formed by transfer molding so as to cover an entirety of the capacitor element 11 and a connecting portion between the capacitor element 11 and each of the anode and the cathode terminals 19 and 23. Then, the encapsulation resin 15, together with the anode and the cathode terminals 19 and 23, is cut to a desired outer dimension by, for instance, dicing (along the planes depicted by A1—A1 and B1—B1 in FIG. 2). Thus, the chip-type capacitor illustrated in FIG. 1 is obtained.

The existing chip-type capacitor 10 is simple in connecting structure between the capacitor element 11 and each of the anode and the cathode terminals 19 and 23. It is therefore possible to improve an accommodation volume efficiency of the capacitor element 11 with respect to the encapsulation resin 15. Accordingly, the chip-type capacitor can be reduced in size and thickness and yet large in capacity so as to meet the recent demand for a small-sized, thin-profile, and light-weight portable equipment, such as a mobile telephone.

In the existing chip-type capacitor, sections of the anode and the cathode terminals 19 and 23 are exposed on the side surfaces (along the planes depicted by A1—A1 and B1—B1 in FIG. 2) of the capacitor 10. When the capacitor 10 is mounted on a substrate 25, a plating process for plating the sections of the anode and the cathode terminals 19 and 23 must be carried out in order to assure wetting-up (hereinafter referred to as a "fillet") of a solder 29 over the sections of the anode and the cathode terminals 19 and 23. The application of the plating process brings about the following problems.

(a) The production cost is increased.

(b) The production time (lead-time) is increased.

(c) If a liquid leaks into the inside of the encapsulation resin during a series of plating processes such as degreasing, plating, cleaning and rust-proofing, the electric characteristics and the reliability of the capacitor will be deteriorated.

In mounting of the chip-type capacitor, it is general that the capacitor is mounted on a land 27 formed on the substrate 25 and thereafter soldered by reflow soldering. At that time, due to the surface tension (as depicted by white arrows 28 in FIG. 1) of the solder 29, a so-called Manhattan phenomenon or Tombstone phenomenon is often caused to occur in which one of the terminals stands up from the substrate 25 to be perpendicular thereto. In particular, such phenomenon is more likely to occur in a smaller-size and lighter-weight tiny chip. It is therefore essential and indispensable to form a fillet which serves to improve the stability of a mounting posture.

In order to overcome the above-mentioned problems, References 1 and 2 mentioned above disclose first and second conventional methods of forming a fillet without performing the plating process after the terminals are cut.

Figure 3:
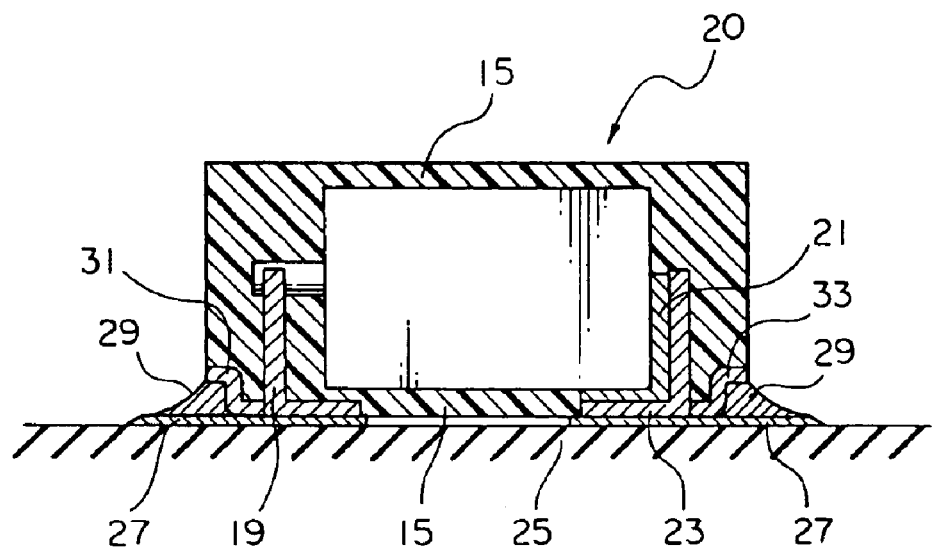
FIG. 3 is a sectional view of a conventional chip-type capacitor when it is mounted on a substrate.

Referring to FIG. 3, the first conventional method (Reference 1) will be described. In a conventional chip-type capacitor 20 illustrated in the figure, an anode terminal 19 and a cathode terminal 23 are provided with terminal bending portions 31 and 33, respectively, so as to allow a solder 29 to enter into spaces under the bending portions 31 and 33, thereby forming fillets.

Figure 4:
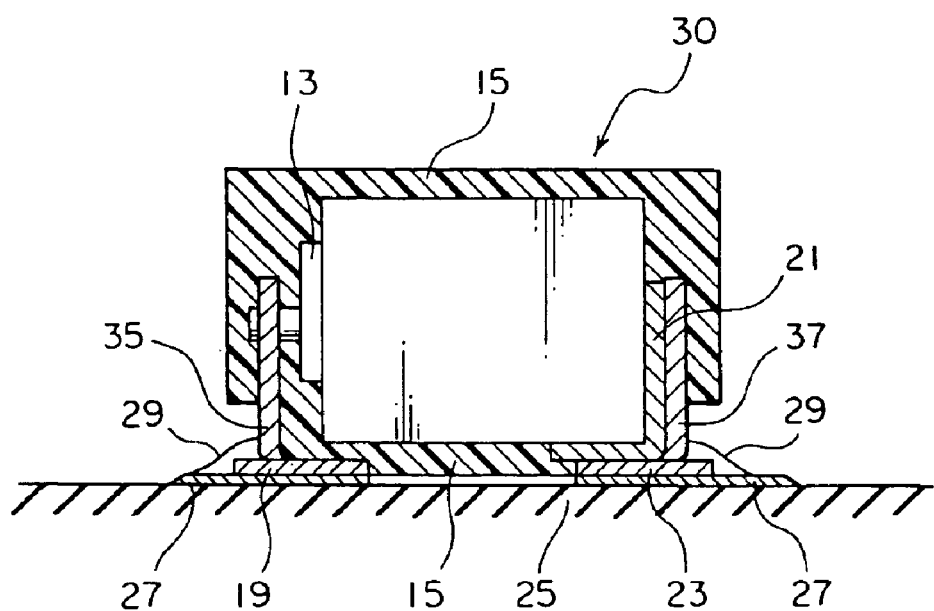
FIG. 4 is a sectional view of another conventional chip-type capacitor in the state where it is mounted on a substrate.
Figure 5:
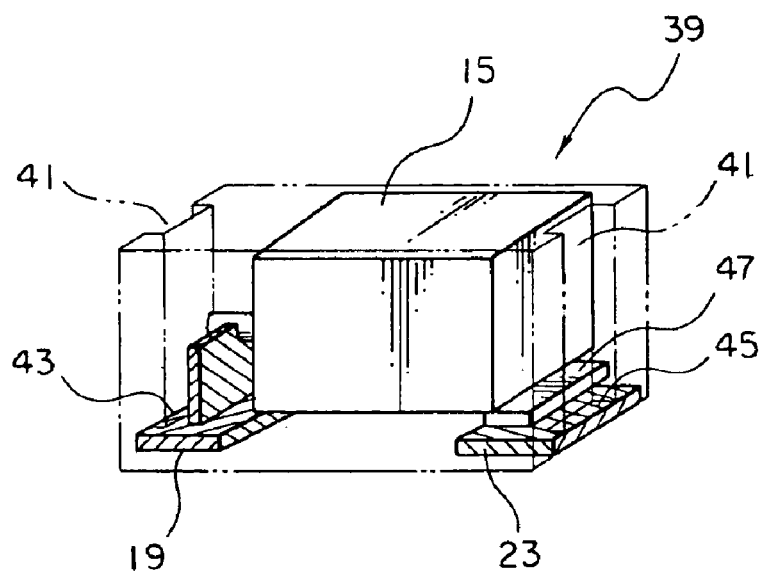
FIG. 5 is a perspective view of a chip-type capacitor according to one embodiment of the present invention.
Figure 6:
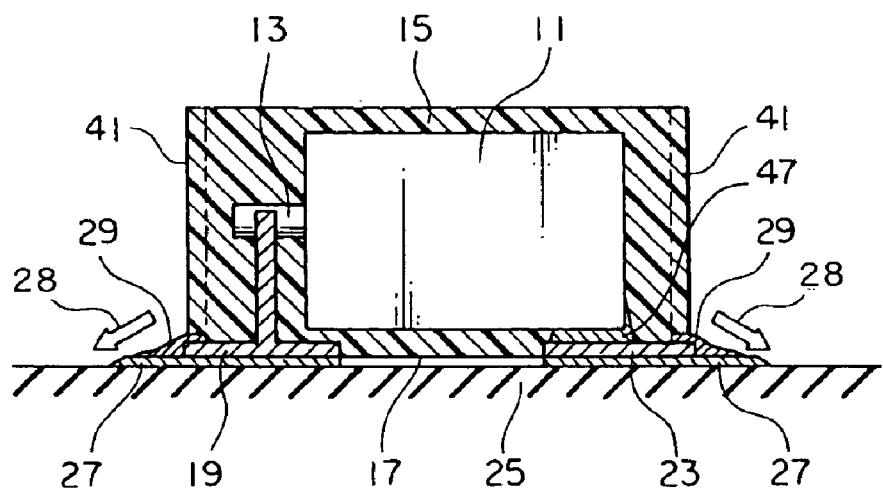
FIG. 6 is a sectional view of the chip-type capacitor illustrated in FIG. 5 when it is mounted on a substrate.

Referring to FIG. 4, the second conventional method (Reference 2) will be described. In another conventional chip-type capacitor 30 illustrated in the figure, a part of an anode terminal 19 and a part of a cathode terminal 23 are raised to form terminal standing-up portions 35 and 37, which are exposed on outer surfaces, i.e., side surfaces of an encapsulation resin 15. Fillets are formed at the standing-up portions 35 and 37.

Now, description will be made of embodiments of the present invention with reference to the drawing.

Referring to FIGS. 5 through 8, a chip-type capacitor 39 according to one embodiment of the present invention includes a capacitor element 11, an encapsulation resin 15, an anode terminal 19, and a cathode terminal 23. The anode terminal 19 has a base portion whose bottom surface is exposed on a mounting surface 17 of the encapsulation resin 15 and a standing-up portion perpendicular to the base portion. An anode lead wire 13 led out from the capacitor element 11 is connected to the standing-up portion of the anode terminal 19 by the use of a known technique such as laser welding. The cathode terminal 23 is connected and fixed to a cathode layer of the capacitor element 11 through a conductive adhesive 47 so that a bottom surface of the cathode terminal 23 is exposed on the mounting surface 17. The above-mentioned structure is substantially similar to that of the existing chip-type capacitor described in conjunction with FIGS. 1 and 2.

Each of the anode and the cathode terminals 19 and 23 comprises a belt-like metal plate having a uniform thickness and preliminarily subjected to solder plating.

The encapsulation resin 15 has opposite cutting surfaces (along the planes A1—A1 and B1—B1 in FIG. 7) provided with depressed portions 41, respectively. Owing to the presence of the depressed portions 41, top surfaces of the anode and the cathode terminals 19 and 23 opposite to the bottom surfaces are partially exposed out of the encapsulation resin 15 to form anode and cathode terminal exposed portions 43 and 45. Thus, in each of the anode and the cathode terminals 19 and 23, not only the bottom surface but also a part of the top surface is exposed out of the encapsulation resin 15. The chip-type capacitor 39 is mounted on a substrate 25 as illustrated in FIG. 7.

Figure 8:
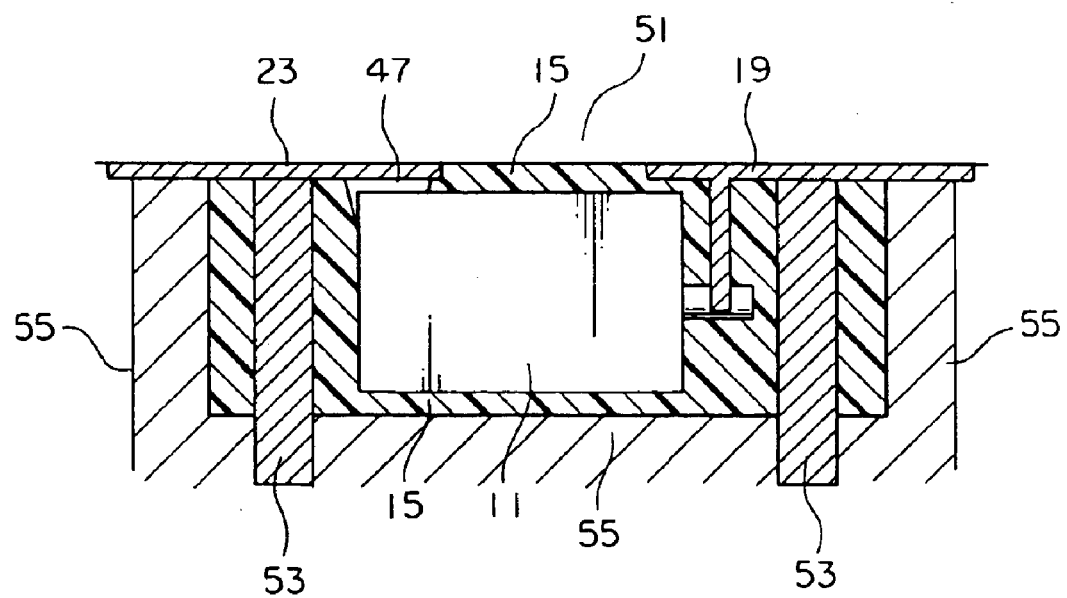
FIG. 8 is a partial sectional view of a transfer molding die for use in producing the chip-type capacitor illustrated in FIG. 5.

As shown in FIG. 8, the encapsulation resin 15 is formed by the use of a transfer molding machine. The transfer molding machine includes an upper die 51 having a flat surface adapted to be brought into tight contact with the base portion of the anode terminal 19 and the cathode terminal 23, plungers 53 having a rectangular section and disposed so as to clamp a part of the anode terminal 19 and a part of the cathode terminal 23 without leaving a gap and to face the upper die 51, and a lower die 55 including the plunger 53 and adapted to be brought into tight contact with the upper die 51. The lower die 55 surrounds an entirety of the capacitor element 11, a connecting portion between the anode terminal 19 and the anode lead wire 13, and a connecting portion between the cathode terminal 23 and the capacitor element 11.

Figure 7:
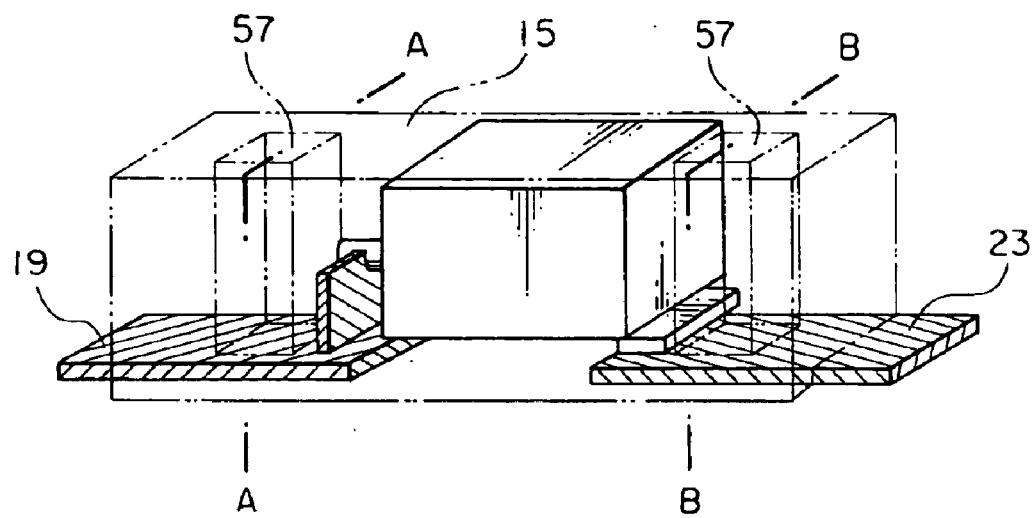
FIG. 7 is a perspective view for describing a production process of the chip-type capacitor illustrated in FIG. 5.

Referring to FIG. 7, the encapsulation resin 15 formed by the transfer molding machine is provided with a pair of cavity portions 57 having a rectangular-cylindrical shape and formed on the anode terminal 19 and the cathode terminal 23, respectively. The cavity portions 57 are formed by the plungers 53 so as to reach the top surfaces of the anode and the cathode terminals 19 and 23, respectively. Thereafter, across the cavity portions 57 (i.e., along the planes A—A and B—B in FIG. 7), the encapsulation resin 15, together with the anode and the cathode terminals 19 and 23, is cut into a predetermined dimension by any appropriate means, such as dicing, to define the opposite side surfaces perpendicular to a longitudinal direction of the capacitor element 11. Thus, the chip-type capacitor 39 is completed.

Turning back to FIG. 5, the chip-type capacitor 39 thus obtained has the structure in which the depressed portions 41 are formed on the cutting surfaces or the side surfaces of the capacitor 39 to expose the terminal exposed portions 43 and 45 of a rectangular shape on the top surfaces of the anode and the cathode terminals 19 and 23 that are opposite to the bottom surfaces. Since the terminal exposed portions 43 and 45 are preliminarily solder-plated, it is possible to easily form fillets by wetting-up of the solder 29 when the capacitor 39 is mounted on the substrate. In order to further stabilize the mounting posture of the capacitor 39, each of the terminal exposed portions 43 and 45 preferably has a depth corresponding to three times or more the thickness of the terminal and a width corresponding to two thirds or more the width of the cutting surface (side surface) of the capacitor 39.

The chip-type capacitor 39 according to the present invention has the following advantages over the conventional chip-type capacitors.

(A) The production cost can be reduced because the fillet can be formed without requiring micro-bending of the terminal.

(B) It is possible to reliably prevent the resin from intrusion and adhesion to the surface of the terminal without requiring a step of adhering a masking tape or a horning step after the molding because the surface of the terminal over which the solder will wet up upon mounting is tightly contacted and pressed by the plunger.

(C) Since the fillet can be assuredly observed from the above, inspection can be easily carried out after the capacitor is mounted on the substrate.

Figure 9:
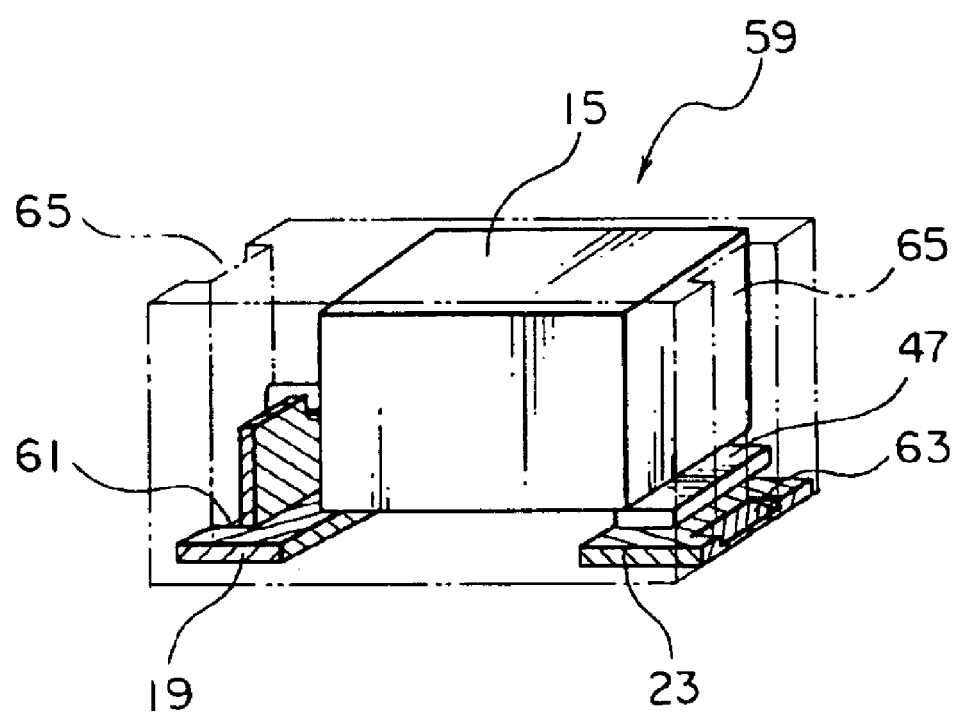
FIG. 9 is a perspective view of a chip-type capacitor according to another embodiment of the present invention.

Referring to FIG. 9, a chip-type capacitor 59 according to another embodiment of the present invention is different in structure from the foregoing embodiment in the following respect. Specifically, a tip end portion of the plunger (i.e., a surface to be brought into contact with the terminal) is tapered (inclined) toward an outer periphery of the encapsulation resin 15. In this event, the terminal has an outermost end smaller in thickness than the other end or an inner end. In other words, each of terminal exposed portions 61 and 63 formed by a depressed portion 65 has a downward inclination towards the cutting surface of the encapsulation resin 15 so that the solder wets up more easily. In this case, the thickness of the terminal at the outermost end exposed on the cutting surface is preferably a half or less the thickness of the terminal at the inner end.

Although each of the terminal exposed portions 43, 45, 61 and 63 has a rectangular shape in the embodiments described above, it is readily understood that the terminal exposed portion may be modified into various other shapes, such as a semicircular shape (the plunger has a circular section), a triangular shape (the plunger has a rhombic section), or a trapezoidal shape (the plunger has a hexagonal section). Furthermore, a plurality of terminal exposed portions may be formed on each of the cutting surfaces.

As described above, according to the present invention, the chip-type capacitor is produced with the depressed portion formed on the side surface or cutting surface of the capacitor so that the terminal exposed portion exposed out of the encapsulation resin is formed on the top surface of the terminal that is opposite to the bottom surface exposed on the mounting surface of the encapsulation resin. With this structure, the fillet formation by the wetting-up of the solder, which is essential and indispensable for stabilization of the mounting posture, can be realized without requiring microprocessing of the terminal or an additional production step. Therefore, it is possible to reduce the production cost. Furthermore, the state of the fillet formation can be observed from the above so that appearance inspection of the capacitor can easily be performed after it is mounted on the substrate.

Although the present invention has been shown and described in conjunction with a few preferred embodiments thereof, it should be understood by those skilled in the art that the present invention is not limited to the foregoing description but may be changed and modified in various other manners without departing from the spirit and scope of the present invention as set forth in the appended claims.

What is claimed is:

1. A chip-type capacitor including a capacitor element, an encapsulation resin covering an entirety of the capacitor element, an anode terminal having a base portion whose bottom surface is exposed on a mounting surface of the encapsulation resin and a standing-up portion perpendicular to the base portion and having one end connected to the base portion, and a cathode terminal having a bottom surface exposed on the mounting surface of the encapsulation resin, the capacitor element including a porous anode body made of a valve action metal in which an anode lead wire is buried with its one end led out therefrom, a dielectric oxide film formed on the anode body; an electrolyte layer formed on the dielectric oxide film, and a cathode layer formed on the electrolyte layer, the standing-up portion of the anode terminal having the other end welded to the anode lead wire so as to intersect therewith, the cathode terminal being connected and fixed through a conductive adhesive to the cathode layer so as to expose a bottom surface on the mounting surface of the encapsulation resin, wherein:

the chip-type capacitor is provided with a depressed portion formed on each of opposite side surfaces of the encapsulation resin and extending in a direction perpendicular to a longitudinal direction of the capacitor element, thereby partially exposing a top surface of each of the anode and the cathode terminals that is opposite to the bottom surface to form a terminal exposed portion exposed out of the encapsulation resin.

2. A chip-type capacitor as set forth in claim 1, wherein:

at least one terminal exposed portion is formed.

3. A chip-type capacitor as set forth in claim 1, wherein:

the terminal exposed portion has a polygonal shape, a semicircular shape, or a trapezoidal shape.

4. A chip-type capacitor as set forth in claim 1, wherein:

one side of the terminal exposed portion in a depth direction has a length corresponding to three times or more the thickness of each of the anode terminal and the cathode terminal.

5. A chip-type capacitor as set forth in claim 1, wherein:

one side of the terminal exposed portion in a width direction has a length corresponding to two thirds or more the width of the side surface of the encapsulation resin.

6. A chip-type capacitor as set forth in claim 1, wherein:

the terminal exposed portion has an outermost end thinner than the other end.

7. A chip-type capacitor as set forth in claim 6, wherein:

the thickness of the outermost end of the terminal exposed portion is one half or less the thickness of the other end.

8. A method of producing a chip-type capacitor set forth in claim 1, the method comprising the steps of forming, by transfer molding, a cavity portion on each of the side surfaces of the encapsulation resin so that the cavity portion reaches the top surface of each of the anode and the cathode terminals that is opposite to the bottom surface exposed on the mounting surface of the encapsulation resin.

9. A method as set forth in claim 8, further comprising the step of cutting the encapsulation resin, the anode terminal, and the cathode terminal across the cavity portion and along a plane perpendicular to a longitudinal direction of the capacitor element.

10. A molding die for use in a method of producing a chip-type capacitor set forth in claim 8, the molding die comprising:

an upper die having a flat surface adapted to be brought into tight contact with the base portion of the anode terminal and with the cathode terminal; and a lower die which is adapted to be brought into tight contact with the upper die and surrounding an entirety of the capacitor element, a connecting portion between the anode terminal and the anode lead wire, and a connecting portion between the cathode terminal and the capacitor element, the lower die including a pair of plungers faced to the upper die and clamping a part of the base portion of the anode terminal and a part of the cathode terminal without leaving a gap, respectively, the plungers being adapted to form the cavity portions.

11. A molding die as set forth in claim 10, wherein:

the plunger has a polygonal section, a circular section, or a rhombic section.

12. A molding die as set forth in claim 10, wherein:

the plunger has a tapered surface as a surface to be brought into contact with the anode terminal or the cathode terminal.

13. A molding die as set forth in claim 11, wherein:

the plunger has a tapered surface as a surface to be brought into contact with the anode terminal or the cathode terminal.

* * * * *